United States Patent
McMiles

(10) Patent No.: US 10,371,272 B2
(45) Date of Patent: Aug. 6, 2019

(54) SHUTTLE VALVE

(75) Inventor: Barry J McMiles, Houston, TX (US)

(73) Assignee: The Subsea Company, Houston, TX (US)

( * ) Notice: Subject to any disclaimer, the term of this patent is extended or adjusted under 35 U.S.C. 154(b) by 762 days.

(21) Appl. No.: 13/320,062

(22) PCT Filed: Oct. 3, 2011

(86) PCT No.: PCT/US2011/054538
§ 371 (c)(1),
(2), (4) Date: Nov. 11, 2011

(87) PCT Pub. No.: WO2012/047777
PCT Pub. Date: Apr. 12, 2012

(65) Prior Publication Data
US 2012/0234399 A1 Sep. 20, 2012

Related U.S. Application Data

(60) Provisional application No. 61/389,343, filed on Oct. 4, 2010.

(51) Int. Cl.
F16K 11/07 (2006.01)
F15B 13/02 (2006.01)

(52) U.S. Cl.
CPC ............ F16K 11/07 (2013.01); F15B 13/028 (2013.01); *Y10T 137/2569* (2015.04); *Y10T 137/87692* (2015.04)

(58) Field of Classification Search
CPC .......... F16K 11/02; F16K 15/066; F16K 3/16; F16K 3/30; F16K 11/07; Y10T 137/87692; Y10T 137/2567; Y10T 137/2564; Y10T 137/2559; Y10T 137/87949; F15B 13/028
USPC .................................. 137/109, 11, 111, 112
See application file for complete search history.

(56) References Cited

U.S. PATENT DOCUMENTS

| | | | | |
|---|---|---|---|---|
| 2,471,237 A | * | 5/1949 | Pasturczak | 137/614.03 |
| 3,431,942 A | * | 3/1969 | Kopaska | 137/614.05 |
| 3,565,115 A | * | 2/1971 | Beckett | F15B 13/04 |
| | | | | 137/625.69 |
| 4,386,625 A | * | 6/1983 | Perkins et al. | 137/255 |
| 4,467,825 A | * | 8/1984 | Boyd | 137/112 |
| 4,614,202 A | * | 9/1986 | Halvorsen et al. | 137/118.02 |
| 5,830,023 A | * | 11/1998 | Brogdon | 440/88 R |

(Continued)

OTHER PUBLICATIONS

Definition of "Wrench"; www.merriam-webster.com/dictionary/wrench; Retrieved Apr. 9, 2018.*

Primary Examiner — Reinaldo Sanchez-Medina
Assistant Examiner — Nicole Gardner
(74) Attorney, Agent, or Firm — The Petruzzi Law Firm; James D. Petruzzi

(57) ABSTRACT

A shuttle valve has a housing with a plurality of inlet ports, an outlet port for fluid flow, and a passageway for fluid to flow from any one of the inlet ports to the outlet port. Each Inlet port has an associated plunger configured one to the other such that when sufficient pressurized fluid is flowing into any one of the inlet ports, fluid is prevented from flowing into any other inlet port. The plungers include male and female mating portions with a radial seal between them. A biasing spring allows one of the plungers to allow backward fluid flow through the associated inlet port when not under pressure.

14 Claims, 2 Drawing Sheets

(56) References Cited

U.S. PATENT DOCUMENTS 6,257,268 B1 * 7/2001 Hope et al. .................... 137/112
8,549,875 B2 * 10/2013 Moustgaard et al. .......... 62/527

* cited by examiner

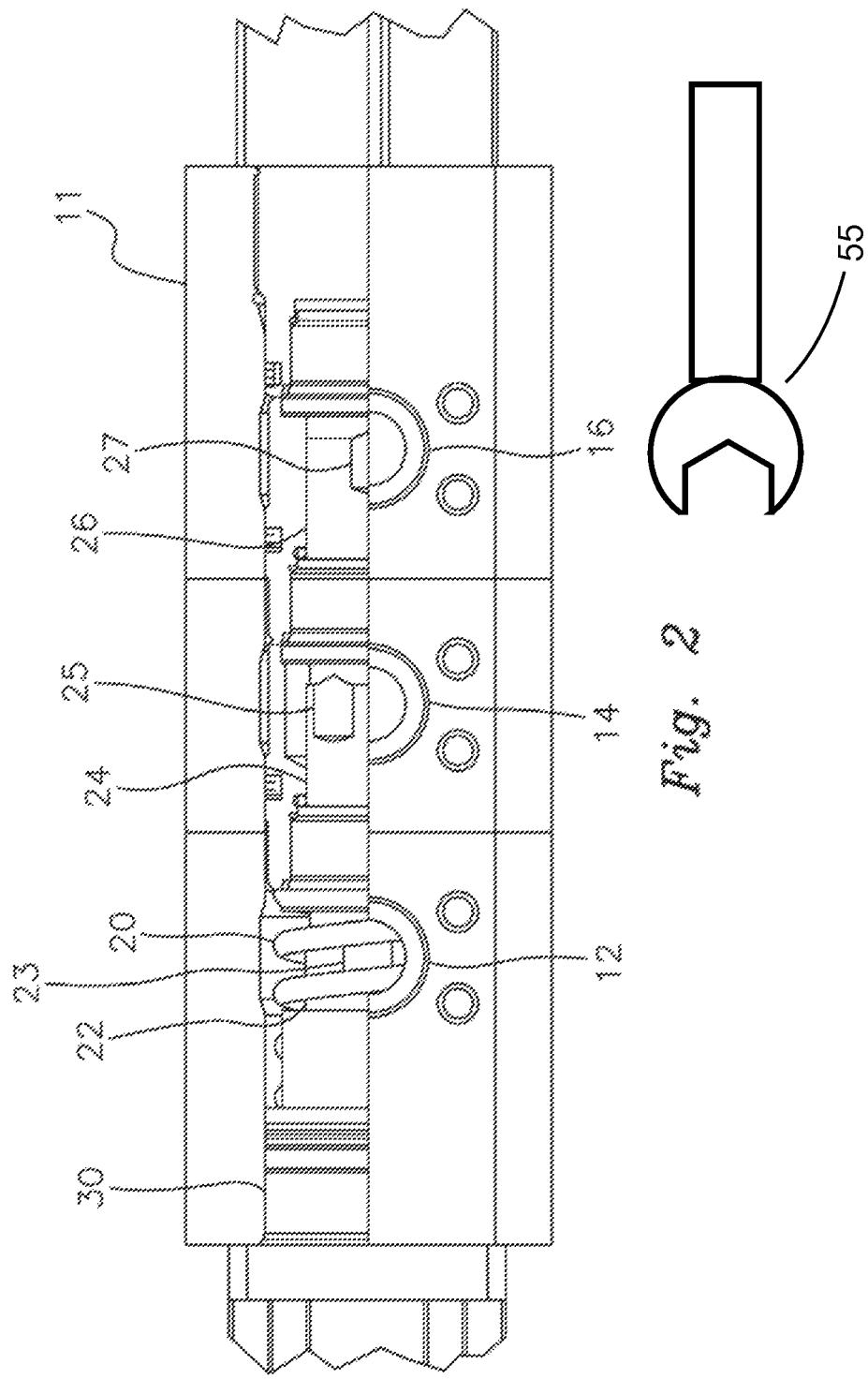

SHUTTLE VALVE

CROSS REFERENCE TO RELATED APPLICATIONS

This application is based on provisional patent application No. 61/389,343 entitled "Shuttle Valve" filed on Oct. 4, 2010, which is hereby incorporated by reference as if fully set forth herein.

BACKGROUND OF THE INVENTION

The present invention relates to valves and more particularly to a shuttle valve for use in subsea applications and other desired locations.

A shuttle valve is a type of valve that allows fluid to flow through it from one of two or more sources. In the basic, two-source structure, a shuttle valve is like a tube with three openings, two for fluid inflow and one for fluid outflow. A blocking valve element moves freely within the tube such that when pressure from a fluid is exerted through a first fluid inlet opening, it pushes the blocking valve towards the other fluid inflow opening, which prevents the fluid from travelling through that opening, but allows it to flow through the first inlet to the outlet. In this way, two different sources can provide pressurized fluid without the threat of backflow from one inlet source to the other.

Numerous valve devices for subsea applications exist, such as disclosed in U.S. Pat. No. 4,467,825, and include a body with two or more input ports, one of which is used to shift fluid in the direction of another port, often perpendicular to the two input ports, to actuate the valve and cause the operation of another mechanism to operate.

Most common, shuttle valves are employed in deep sea operations and convey fluid to cause operation of rams or valves for blow out operations. Generally, fluids are maintained at particular pressures, such as between about 1,500 p.s.i to about 5,000 p.s.i. and are in fluid communication with particular ports of a shuttle valve so that a supplemental fluid, redundant control system or emergency systems can be introduced into the shuttle valve and cause a perpendicular member to operate. Often, once a supplemental fluid is introduced into a shuttle valve, fluid in the initial ports becomes mixed due to design flaws or inherent problems with the shuttle valves, while the fluid being transmitted to cause actuation is separated. It is ideal that in the event that fluid could be transmitted from another source and that existing ports could remain isolated from the other ports.

Due to the extreme fluid pressures with which these types of shuttle valves are used, the existing shuttle valves are subject to vacillations, where the valve rapidly moves back and forth within the housing, sometimes resulting in breakage. In addition, existing shuttle valves do not allow for easy backflow of fluid through an inlet port such that an inlet port may be designated as a return to surface port to allow controlled fluid flow when the system is no longer pressurized.

Thus, there exists a need for a shuttle valve that isolates fluid positively in opposing ports while allowing the transmission of fluid during selected operation.

BRIEF SUMMARY OF THE INVENTION

The primary advantage of the invention is to provide an improved shuttle valve that retards fluid flow from more than one of a plurality of inlet ports.

Another advantage of the invention is to provide a shuttle valve that reduces vacillation of the port blocking mechanism while under pressure.

Another advantage of the invention is to provide a shuttle valve that more easily allows fluid backflow though a particular inlet port while not under pressure.

Another advantage of the invention is to provide a shuttle valve that reduces fluid flow rate requirements to block all but one inlet port.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is shown a shuttle valve assembly having a housing with a plurality of inlet ports and an outlet port for fluid flow; the housing having a passageway for fluid to flow from any one of said plurality of inlet ports to the outlet port; each of the plurality of inlet ports has an associated plunger; the plurality of plungers configured one to the other such that when sufficient pressurized fluid is flowing into any one of the plurality of inlet ports, fluid is prevented from flowing into any other of the plurality of inlet ports; and one or more of the plurality of plungers includes a male portion and a female portion mated together.

In accordance with another preferred embodiment of the invention, there is shown a shuttle valve assembly having a housing having a plurality of inlet ports and an outlet port for fluid flow; the housing having a passageway for fluid to flow from any one of said plurality of inlet ports to the outlet port; each of the plurality of inlet ports has an associated plunger; the plurality of plungers configured one to the other such that when sufficient pressurized fluid is flowing into any one of the plurality of inlet ports, fluid is prevented from flowing into any other of the plurality of inlet ports; and each of the plurality of plungers includes a male portion and a female portion mated together with a radial seal positioned therebetween.

In accordance with another preferred embodiment of the invention, there is shown a shuttle valve assembly having a housing with a plurality of inlet ports and an outlet port for fluid flow; the housing having a passageway for fluid to flow from any one of said plurality of inlet ports to the outlet port; each of the plurality of inlet ports has an associated plunger; the plurality of plungers configured one to the other such that when sufficient pressurized fluid is flowing into any one of the plurality of inlet ports, fluid is prevented from flowing into any other of the plurality of inlet ports; and the plurality of plungers each includes a male portion and a female portion mated together.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 2 shows a cutout assembly view of a shuttle valve according to a preferred embodiment of the invention.

DETAILED DESCRIPTION OF THE PREFERRED EMBODIMENTS

Figure 1:
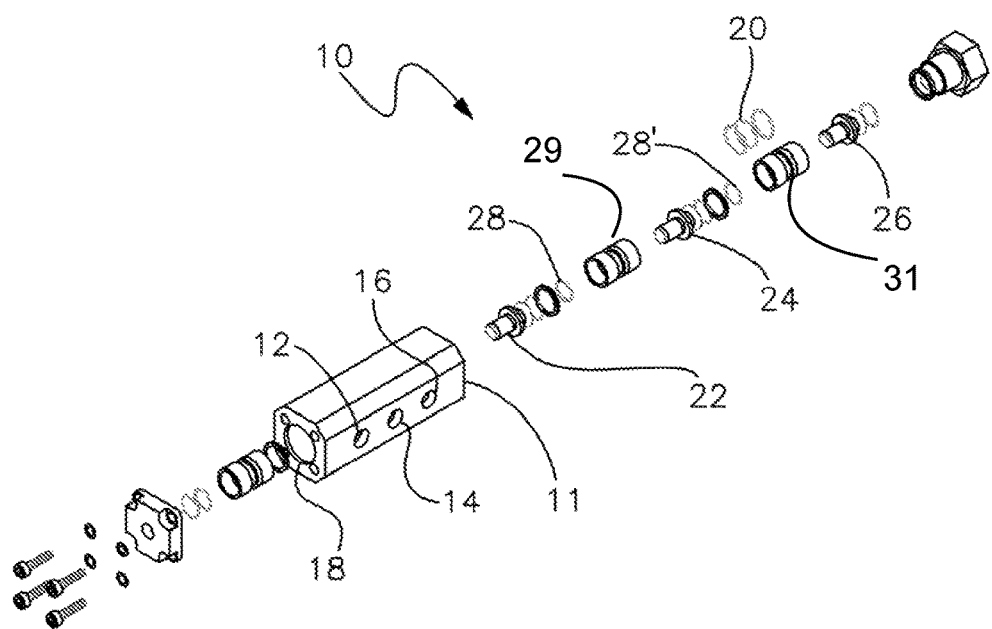
FIG. 1 shows an exploded view of a shuttle valve according to a preferred embodiment of the invention.

Referring now to FIG. 1, an exploded view of a shuttle valve 10 is illustrated. Shuttle valve 10 includes a housing 11, which has first inlet port 12, second inlet port 14, third inlet port 16, and outlet port 18. Shuttle valve 10 also includes a spring apparatus 20, designed to create tension between outlet port 18 and first inlet port 12, though the position of the spring may be to bias any one of inlet ports 12, 14 or 16. Outlet port 18 is separated from first inlet port 12 via a radial seal (not shown). First inlet port 12 is separated from second inlet port 14 via a radial seal 28. Second inlet port 14 is separated from third inlet port 16 via a second radial seal 28'. Each of first inlet port 12, second inlet port 14 and third inlet port 16 includes an associated spool and a plunger arrangement. Plungers 22, 24, and 26 of each port are in communication with respective spools in a male-female mating relationship and are positioned between an immovable member and outlet port 18. Plungers 22, 24, and 26 include openings to allow fluid communication to thrust each of plungers 22, 24, and 26 towards outlet port 18. Additionally, seal components are disposed between plungers 22, 24, and 26 to prevent the passage of fluid about first inlet port 12, second inlet port 14, or third inlet port 16 as either a single port or a combination of ports is closed when fluid is communicated an alternative port such as first inlet port 12, second inlet port 14, or third inlet port 16. In a conventional manner, when one inlet port is pressurized with fluid flow, the plunger configuration, one to the other, is such that it prevents fluid flow to the remaining inlet ports.

It will be appreciated that the number of inlet ports is not important to the present invention, except that there is needed two or more and in the illustrated embodiment there is shown three inlet ports.

As sufficient fluid pressure builds within a selected one of first inlet port 12, second inlet port 14, and third inlet port 16, compression is exerted on spring apparatus 20. Plungers 22, 24, and 26 along with their respective spools are built such that fluid is not allowed to communicate between inlet ports. In the event that one desires to incrementally build pressure within shuttle valve 10, fluid pressure can be added via any one of plungers 22, 24, and 26 in a manner conventionally know and disclosed in U.S. Pat. No. 4,467,825. Plungers 22, 24, and 26 work in combination with inlet ports 12, 14, and 16 and spring apparatus 20 to isolate and convey fluid as is desirable. Fluid conveyed via first inlet port 12 is placed in communication with plunger 22. Similarly fluid conveyed via second inlet port 14 communicates with plunger 24. Additionally, fluid conveyed within third inlet port 16 communicates with plunger 26.

Referring now to FIG. 2, a cutout assembly view of shuttle valve 10 is illustrated and depicts plungers 22, 24, and 26 along with spring apparatus 20 in alignment. A portion of housing 11 is cutout and shows the relative alignment of plungers to first inlet port 12, second inlet port 14, and third inlet port 16. Plunger 22 includes aperture 23. Plunger 24 includes aperture 25. Plunger 26 includes aperture 27. Apertures 23, 25, 27 are configured such that a wrench 55 may be used to positively mate the plunger and spool, male-female, configuration. As shown in the exploded view in FIG. 1, spool 29 is mateable to plunger 24. Second Spool 31 is mateable to plunger 26. The plunger/spool mated assembly is herein referred to as a plunger.

As fluid is communicated into inlet ports 12, 14, and 16, depending on the position of plungers 22, 24, and 26 relative to shaft 30, fluid is allowed to communicate to outlet port 18. In the event that conditions dispose plunger 22, such that radial seal 28 is disposed beyond first inlet port 12, fluid is unable to communicate through first inlet port 12 and instead must communicate through second inlet port 14 or third inlet port 16. Similarly, in the event that conditions dispose plunger 24 beyond third inlet port 16, fluid is unable to communicate with third inlet port 16 and instead must communicate with first inlet port 12 or second inlet port 14.

When the system is no longer pressurized with fluid flow into any inlet port 12, 14 or 16, spring apparatus 20 biases a plunger, in the illustrated figure the plunger associated with first inlet port 12, such that fluid may flow backwards, out through first inlet port 12. It will be appreciated that any inlet port may be so biased. In this manner, a designated inlet port may be employed as a return port as well.

All of the composition and/or methods disclosed and claimed herein can be made and executed without undue experimentation in light of the present disclosure. While the compositions and methods of this invention have been described in terms of various embodiments, it will be apparent to those of skill in the art that other variations can be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

It will be understood that particular embodiments described herein are shown by way of illustration and not as limitations of the invention. The principal features of this invention can be employed in various embodiments without departing from the scope of the invention. All of the compositions and/or methods disclosed and claimed herein can be made and executed without undue experimentation in light of the present disclosure. Those skilled in the art will recognize, or be able to ascertain using no more than routine experimentation, numerous equivalents to the specific procedures described herein. Such equivalents are considered to be within the scope of this invention and are covered by the claims.

The invention claimed is:

1. A shuttle valve assembly comprising:
   a housing with a plurality of inlet ports and an outlet port for fluid flow;
   said housing having a passageway for fluid to flow from any one of said plurality of inlet ports to said outlet port;
   each of said plurality of inlet ports has an associated plunger;
   said plurality of plungers configured one to the other such that when sufficient pressurized fluid is flowing into any one of the plurality of inlet ports, fluid is prevented from flowing via a radial seal disposed between each of said plungers into any other of the plurality of inlet ports;
   a biasing spring positioned axially in the housing against only one of the plungers to permit backflow through its port when no pressurized fluid flow is present; and
   one or more of the plurality of plungers includes a male portion and a female portion each having a circumferential outer edge, where the plungers are mated together for selective engagement to each other in a fluid blocking position, each of said plungers having an aperture transverse to each plunger positioned opposite to and accessible through one of each port by a tool to positively mate the male-female connection.

2. The shuttle valve as claimed in claim 1 wherein said tool is a wrench.

3. The shuttle valve as claimed in claim 1 wherein the spring to bias one of said plurality of plungers to allow backward fluid flow through the associated inlet port when pressure is vented.

4. The shuttle valve as claimed in claim 1 wherein the radial seal is positioned between each of said plungers along the circumferential outer edge of each plunger.

5. The shuttle valve as claimed in claim 1 wherein all of said plurality of plungers include a male portion, a female portion, where said radial seal is there-between each of said plungers.

6. The shuttle valve as claimed in claim 1 wherein said housing has three inlet ports.

7. A shuttle valve assembly comprising:
a housing having a plurality of inlet ports and an outlet port for fluid flow;
said housing having a passageway for fluid to flow from any one of said plurality of inlet ports to said outlet port;
each of said plurality of inlet ports has an associated plunger;
a plurality of plungers configured one to the other such that when sufficient pressurized fluid is flowing into any one of said plurality of inlet ports, fluid is prevented from flowing into any other of the said plurality of inlet ports via a radial seal between each of said plungers;
a biasing spring positioned along a longitudinal axis of the housing against only one of the plungers to permit backflow through its port when no pressurized fluid flow is present; and
each of said plurality of plungers includes a male portion and a female portion mated together for selective engagement to each other in a fluid blocking position with said radial seal positioned there-between said plungers about the end circumferential edge of each plunger, each of said plungers having an aperture transverse to each plunger positioned opposite to and accessible through one of each port by a tool to positively mate the male-female connection.

8. The shuttle valve as claimed in claim 7 wherein said plurality of inlet ports are configured linearly one to the other.

9. The shuttle valve as claimed in claim 7 wherein said housing has three inlet ports.

10. A shuttle valve assembly comprising:
a housing with a plurality of inlet ports and an outlet port for fluid flow;
said housing having a passageway for fluid to flow from any one of said plurality of inlet ports to said outlet port;
each of said plurality of inlet ports has an associated plunger with a radial seal disposed between each inlet port and associated plunger;
the plurality of plungers configured one to the other such that when sufficient pressurized fluid is flowing into any one of the plurality of inlet ports, fluid is prevented from flowing into any other of the plurality of inlet ports;
a biasing spring positioned in a longitudinal axis of the housing against only one of the plungers to permit backflow through its port when no pressurized fluid flow is present; and
said plurality of plungers each includes a male portion and a female portion mated together for selective engagement to each other in a fluid blocking position, each of said plungers having an aperture transverse to each plunger positioned opposite to and accessible through one of each port by a tool to positively mate the male-female connection.

11. The shuttle valve as claimed in claim 10 wherein said plurality of inlet ports are configured linearly one to the other.

12. The shuttle valve as claimed in claim 10 wherein said radial seal is positioned between each plunger and engaged along the edge of each plunger.

13. The shuttle valve as claimed in claim 10 wherein the housing has three inlet ports.

14. The shuttle valve as claimed in claim 10 wherein all of said plurality of plungers include a male portion and female portion, and said radial seal is there-between said plungers.

* * * * *